United States Patent
Asano et al.

(10) Patent No.: US 9,660,264 B2
(45) Date of Patent: *May 23, 2017

(54) LITHIUM SECONDARY BATTERY

(71) Applicant: Panasonic Intellectual Property Management Co., Ltd., Osaka (JP)

(72) Inventors: Tetsuya Asano, Kyoto (JP); Tomoyuki Komori, Osaka (JP); Eiji Fujii, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 156 days.

This patent is subject to a terminal disclaimer.

(21) Appl. No.: 14/699,440

(22) Filed: Apr. 29, 2015

(65) Prior Publication Data

US 2015/0243985 A1    Aug. 27, 2015

Related U.S. Application Data

(63) Continuation of application No. PCT/JP2014/003673, filed on Jul. 10, 2014.

(30) Foreign Application Priority Data

Aug. 29, 2013  (JP) ................................. 2013-177673

(51) Int. Cl.
*H01M 4/525* (2010.01)
*H01M 4/131* (2010.01)
(Continued)

(52) U.S. Cl.
CPC ........... *H01M 4/525* (2013.01); *H01M 4/131* (2013.01); *H01M 4/66* (2013.01); *H01M 10/052* (2013.01);
(Continued)

(58) Field of Classification Search
CPC .. H01M 4/515; H01M 4/66; H01M 2004/028; H01M 10/052; H01M 10/0525; Y02T 10/7011
See application file for complete search history.

(56) References Cited

U.S. PATENT DOCUMENTS

| | | | |
|---|---|---|---|
| 2010/0173204 A1 | 7/2010 | Sugiura et al. | |
| 2011/0195310 A1 | 8/2011 | Kawamoto et al. | |
| 2012/0074351 A1 | 3/2012 | Levasseur et al. | |

FOREIGN PATENT DOCUMENTS

| JP | 2003197256 | * | 7/2003 | ............ H01M 10/40 |
|---|---|---|---|---|
| JP | 3971911 B2 | | 9/2007 | |

(Continued)

OTHER PUBLICATIONS

Kobayashi, Rigaku Journal vol. 26 No. 1 2010 pp. 3-11.*

(Continued)

*Primary Examiner* — Patrick Ryan
*Assistant Examiner* — Aaron Greso
(74) *Attorney, Agent, or Firm* — McDermott Will & Emery LLP

(57) ABSTRACT

A lithium secondary battery includes: a positive electrode including a positive-electrode active material layer; a negative electrode including a negative-electrode active material layer; and an ion conductor being lithium ion conductive and interposed between the positive electrode and the negative electrode. The positive-electrode active material layer is composed of lithium cobaltate, and has an $\alpha$-NaFeO$_2$ type crystal structure. The positive-electrode active material layer is composed only of first regions oriented in the (110) plane and second regions oriented in the (018) plane, the first regions and the second regions being mixedly present in the xy plane of the positive-electrode active material layer, where x and y axes are defined as two axes that are parallel to the principal face of the positive-electrode active material layer, and a z axis is defined as an axis perpendicular to the principal face.

11 Claims, 7 Drawing Sheets

(51) Int. Cl.
*H01M 4/66* (2006.01)
*H01M 10/052* (2010.01)
*H01M 10/0525* (2010.01)
*H01M 4/02* (2006.01)

(52) U.S. Cl.
CPC .. *H01M 10/0525* (2013.01); *H01M 2004/028* (2013.01); *Y02T 10/7011* (2013.01)

(56) References Cited

FOREIGN PATENT DOCUMENTS

| | | |
|---|---|---|
| JP | 2009-181871 A | 8/2009 |
| JP | 2009-295514 A | 12/2009 |
| JP | 2011-165404 A | 8/2011 |
| JP | 2012-043794 A | 3/2012 |
| WO | 2010-074314 A1 | 7/2010 |

OTHER PUBLICATIONS

Hirayama et al. Journal of Power Sources vol. 168, 2007 pp. 493-500.*

Hirayama, M., et al..: "Characterization of electrode/electrolyte interface for lithium batteries using in situ synchrotron X-ray reflectometry—A new experimental technique for LiCoO2 model electrode", Journal of Power Sources, vol. 168, 2007, pp. 493-500.

Katsui, H., et al.: "Epitaxial growth 01(104)— and (018)—oriented LiCoO2 films on MgO single crystals prepared by chemical vapor deposition", Surface & Coatings Technology, 218, 2013, pp. 57-61.

International Search Report issued in PCT/JP2014/003673, dated Aug. 12, 2014, with English translation.

* cited by examiner

# LITHIUM SECONDARY BATTERY

This is a continuation of International Application No. PCT/JP2014/003673, with an international filing date of Jul. 10, 2014, which claims priority of Japanese Patent Application No. 2013-177673, filed on Aug. 29, 2013, the contents of which are hereby incorporated by reference.

BACKGROUND

1. Technical Field

The present application relates to a lithium secondary battery.

2. Description of the Related Art

For use in electric vehicles and for electric storage purposes, secondary batteries are expected to increase in size, especially in order to produce high output power. Generally speaking, a secondary battery is structured so as to include a positive electrode and a negative electrode, and an ion conductor interposed therebetween. As ions migrate between the positive electrode and the negative electrode with oxidation/reduction of the positive electrode and the negative electrode, the secondary battery is able to undergo charging and discharging.

In order to obtain high output power, it is important to reduce the resistance against migration of ions as a carrier. Japanese Patent No. 3971911 (hereinafter, referred to as Patent Document 1) discloses a problem that, in a secondary battery containing lithium cobaltate as a positive-electrode active material, when the lithium cobaltate is made into a thin layer, a layer which is oriented in the c axis direction is likely to be formed, thus hindering smooth exchange of ions. Therefore, Patent Document 1 proposes using as an active material layer a layer whose c axis is inclined by 60° from the principal face.

SUMMARY

Conventional secondary batteries needed higher output power. One non-limiting, and exemplary embodiment of the present application provides a lithium secondary battery which can attain high output power.

A lithium secondary battery according to an embodiment of the present application comprises: a positive electrode including a positive-electrode active material layer; a negative electrode including a negative-electrode active material layer, the negative-electrode active material layer allowing lithium ions to be inserted and allowing inserted lithium ions to be released; and an ion conductor interposed between the positive electrode and the negative electrode, the ion conductor being lithium ion conductive, wherein, the positive-electrode active material layer comprises lithium cobaltate, and has an α-NaFeO$_2$ type crystal structure; and the positive-electrode active material layer is composed only of first regions oriented in the (110) plane and second regions oriented in the (018) plane, the first regions and second regions being mixedly present in an xy plane of the positive-electrode active material layer, where an x axis and a y axis which are defined as two axes that are parallel to a principal face of the positive-electrode active material layer, and a z axis which is defined as an axis that is perpendicular to the principal face.

A lithium secondary battery according to an embodiment of the present application includes a positive-electrode active material layer of lithium cobaltate, in which first regions oriented in the (110) plane and second regions oriented in the (018) plane are mixedly present, and therefore has excellent cycle characteristics and charge-discharge characteristics.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

DETAILED DESCRIPTION

Figure 1A:
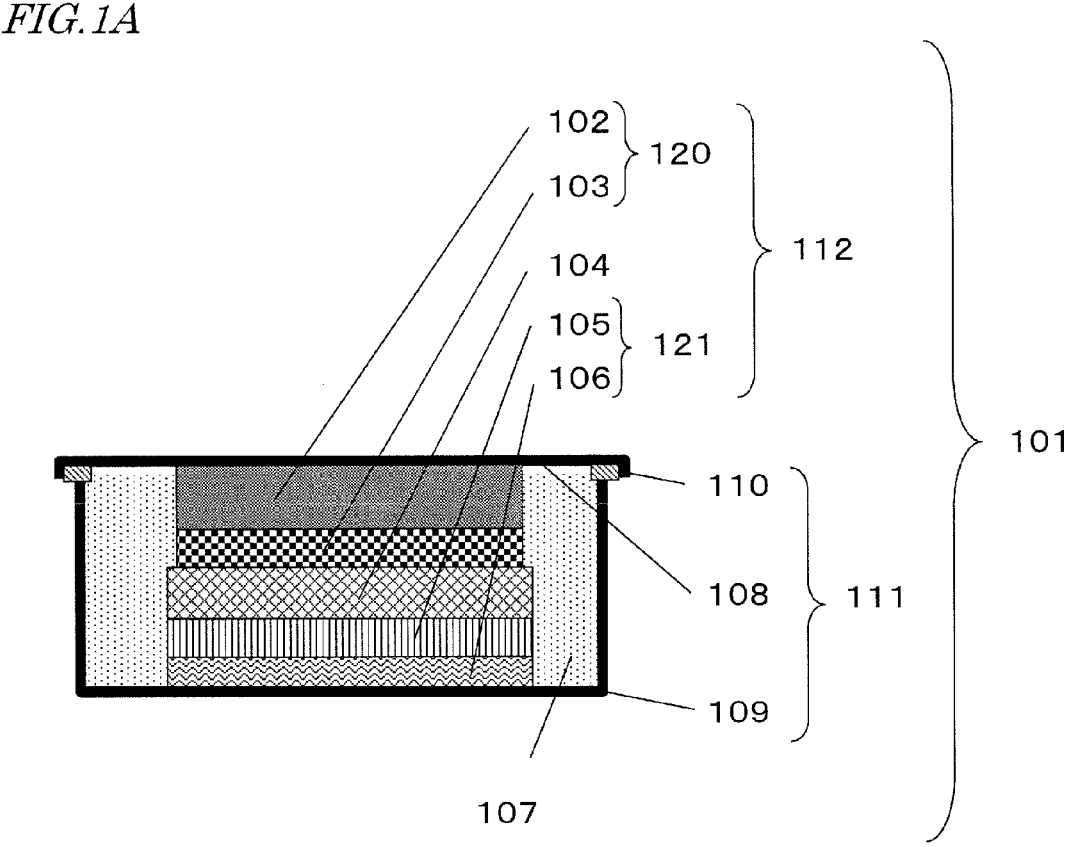
FIG. 1A is a cross-sectional view showing a lithium secondary battery according to a first embodiment.

The inventors have investigated into methods for enhancing the output power of a lithium secondary battery in which crystalline lithium cobaltate is used as the positive-electrode active material.

A crystal of lithium cobaltate has a laminar rock salt structure, in which layers of cobalt oxide and layers of lithium are alternately stacked. Lithium ions are likely to migrate along these layers. In other words, when crystalline lithium cobaltate is used as the positive-electrode active material layer, the lithium cobaltate crystal may be disposed so that each layer in the laminar rock salt structure extends perpendicular to the principal face of the positive electrode, whereby it becomes easy to effect insertion/release of lithium ions to/from the lithium cobaltate, thus presumably enhancing the output power of the lithium secondary battery. For example, Non-Patent Document 1 (Surface & Coatings Technology 218 (2013) 57-61) and Non-Patent Document 2 (Journal of Power Sources 168(2007) 493-500) show discussions of the relationship between the crystal orientation of lithium cobaltate and output characteristics.

However, in this case, with insertion/release of lithium ions, the positive-electrode active material layer repeats expansion and contraction in a parallel direction to the principal face of the positive electrode. Repeated charging and discharging may reduce the strength of adherence between the current collector and the positive-electrode active material layer of the positive electrode, possibly causing the positive-electrode active material layer to peel.

On the other hand, if the lithium cobaltate crystal is disposed so that each layer in the laminar rock salt structure extends parallel to the principal face, the directions of expansion/contraction of the positive-electrode active material layer will be perpendicular to the principal face of the positive electrode. This will presumably reduce the decrease in adherence between the current collector and the positive-electrode active material layer. In this case, however, lithium ion exchange will not smoothly occur, as described in Patent Document 1 and the like.

In view of such problems, the inventors have conceived of a lithium secondary battery having a novel structure. A lithium secondary battery according to an embodiment of the present application is as follows.

A lithium secondary battery according to an embodiment of the present application comprises: a positive electrode including a positive-electrode active material layer; a negative electrode including a negative-electrode active material layer, the negative-electrode active material layer allowing lithium ions to be inserted and allowing inserted lithium ions to be released; and an ion conductor interposed between the positive electrode and the negative electrode, the ion conductor being lithium ion conductive, wherein, the positive-electrode active material layer comprises lithium cobaltate, and has an α-NaFeO$_2$ type crystal structure; and the positive-electrode active material layer is composed only of first regions oriented in the (110) plane and second regions oriented in the (018) plane, the first regions and second regions being mixedly present in an xy plane of the positive-electrode active material layer, where an x axis and a y axis which are defined as two axes that are parallel to a principal face of the positive-electrode active material layer, and a z axis which is defined as an axis that is perpendicular to the principal face.

A [−441] direction in the first regions may be parallel to a [−4-81] direction in the second regions, and a [2-21] direction in the first regions may be parallel to a [100] direction in the second regions.

In an X-ray diffractometry of the positive-electrode active material layer, a ratio (I(018)/I(110)) between a peak intensity I(018) of the (018) plane and a peak intensity I(110) of the (110) plane may satisfy the relationship 0.1<I(018)/I(110)≤2.5.

A ratio between a lattice constant c(110) of the first regions along the c axis and a lattice constant c(018) of the second regions along the c axis may satisfy 0.95<c(110)/c(018)<0.99.

The ion conductor may be a solid electrolyte.

The ion conductor may be an electrolyte solution.

The positive electrode further may comprise a current collector; and the positive-electrode active material layer is an epitaxial film on the current collector.

The current collector may be a strontium titanate substrate, the strontium titanate substrate being doped with a dopant and electrically conductive.

In the positive-electrode active material layer, there may be no overlap between the first regions and the second regions along the z axis direction.

Hereinafter, embodiments of the present disclosure will be described with reference to the drawings.

First Embodiment

A lithium secondary battery according to a first embodiment will be described.

FIG. 1A schematically shows a cross section of a lithium secondary battery 101 of the present embodiment. The lithium secondary battery 101 includes a laminate 112, an ion conductor 107, and a battery case 111 which internally accommodates the ion conductor 107 and the laminate 112.

The laminate 112 includes a positive electrode 120, a negative electrode 121, and a separator 104 interposed between the positive electrode 120 and the negative electrode 121.

The positive electrode 120 includes a positive-electrode current collector 102 and a positive-electrode active material layer 103 which is in contact and electrically connected with the positive-electrode current collector 102. Similarly, the negative electrode 121 includes a negative-electrode current collector 106 and a negative-electrode active material layer 105 which is in contact and electrically connected with the negative-electrode current collector 106.

In the laminate 112, the positive-electrode active material layer 103 and the negative-electrode active material layer 105 are in contact with the separator 104.

The battery case 111 includes a cap 108, a case body 109, and an electrically insulative sealant 110. The case body 109 has an internal space, such that the laminate 112 and the ion conductor 107 are disposed in the internal space. The case body 109 has an opening which is covered with the cap 108, such that the cap 108 and the case body 109 are attached together via the electrically insulative sealant 110.

In the battery case 111, the cap 108 is in contact with the positive-electrode current collector 102, and the bottom face of the case body 109 is in contact with the negative-electrode current collector 106. As a result, the cap 108 and the case body 109 respectively function as a positive-electrode terminal and a negative-electrode terminal.

Hereinafter, the constituent elements will be described in detail.

(Positive-Electrode Active Material Layer 103)

Figure 1B:
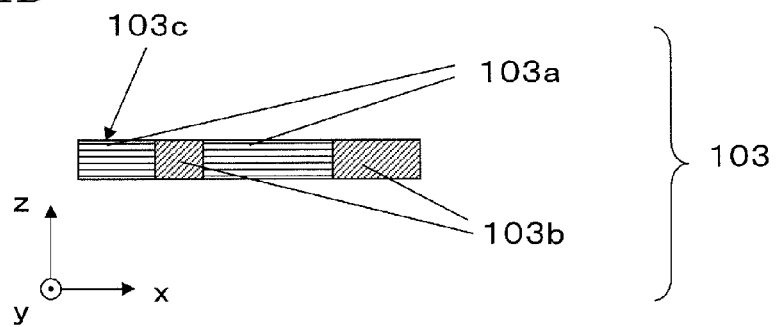
FIG. 1B is a cross-sectional view of a positive-electrode active material layer.

FIG. 1B shows a cross-sectional structural diagram of a positive-electrode active material layer 103 according to this Embodiment 1. The positive-electrode active material layer 103 is composed of a hexagonal material of lithium cobaltate (LiCoO$_2$). More specifically, lithium cobaltate has an α-NaFeO$_2$ type crystal structure. The positive-electrode active material layer 103 may be a thin epitaxial film which is grown on the positive-electrode current collector 102, as will be described later. Moreover, so long as the positive-electrode active material layer 103 has an α-NaFeO$_2$ type crystal structure and is capable of lithium insertion and release, it may be of any composition other than the aforementioned composition. For example, some of the Co sites in lithium cobaltate may be substituted by other metals, e.g., Ni. That is, a composition expressed as LiCo$_{1-x}$M$_x$O$_2$ (0≤x≤0.66, M: Ni, Mn, Al) may be used. So long as the Li:Co composition ratio during discharging is within the range of 0.9 to 1.1, the composition ratio between Li and the metal oxide does not need to be 1:1.

So long as the positive-electrode active material layer 103 has the crystal structure explained below, there is no particular limitation as to the thickness of the positive-electrode active material layer 103. For example, the thickness of the positive-electrode active material layer 103 may be not less than 0.5 μm and not more than 10 μm.

As shown in FIG. 1B, the positive-electrode active material layer 103 includes a plurality of first regions 103a and a plurality of second regions 103b. In the positive-electrode active material layer 103, each first region 103a is a crystalline region which is oriented in the (110) plane, whereas each second region 103b is a crystalline region which is oriented in the (018) plane. More specifically, the positive-electrode active material layer 103 only includes the first regions 103a and the second regions 103b. As used herein, to "only include the first regions 103a and the second regions 103b" means that, when the positive-electrode active material layer 103 is subjected to X-ray diffraction intensity measurement, an integral value of a total of the peaks associated with any crystal which is oriented in the (110) plane and the peaks associated with any crystal oriented in the (018) plane accounts for 95% or more of an integral value of all diffraction peaks.

Within each first region 103a and each second region 103b, the positive-electrode active material layer 103 is a substantially single crystal. Although a plurality of single-crystalline regions exist in the positive-electrode active material layer 103, the orientation of each single crystal is (110) or (018), rather than being random. In this respect, it can be said that the positive-electrode active material layer 103 is not polycrystalline.

The proportion between the first regions 103a and the second regions 103b in the positive-electrode active material layer is defined by an area ratio of diffraction peaks in X-ray diffractometry. Specifically, when X-ray diffractometry is conducted, the ratio (I(018)/I(110)) between peak intensity I(018) of the (018) plane and peak intensity I(110) of the (110) plane satisfy $0.1 < I(018)/I(110) \leq 2.5$. If this ratio is smaller than 0.1, an adequate effect of suppressing expansion/contraction of the positive-electrode active material layer 103, as described below, may not be obtained. If this ratio is greater than 2.5, the proportion of the first regions 103a in the positive-electrode active material layer 103 will become small, so that high output power characteristics may not be adequately obtained.

Given an x axis and a y axis which are defined in parallel to the principal face 103c of the positive-electrode active material layer 103, and a z axis defined in a direction perpendicular to the principal face 103c, a plurality of first regions 103a and a plurality of second regions 103b are mixedly present in the xy plane. On the other hand, the first regions 103a and the second regions 103b have no overlap along the z axis direction, so that no grain boundary exists along the z axis direction. The distribution of the first regions 103a and the second regions 103b in the positive-electrode active material layer 103 can be confirmed via TEM observation of a cross section of the positive-electrode active material layer 103.

Figure 2A:
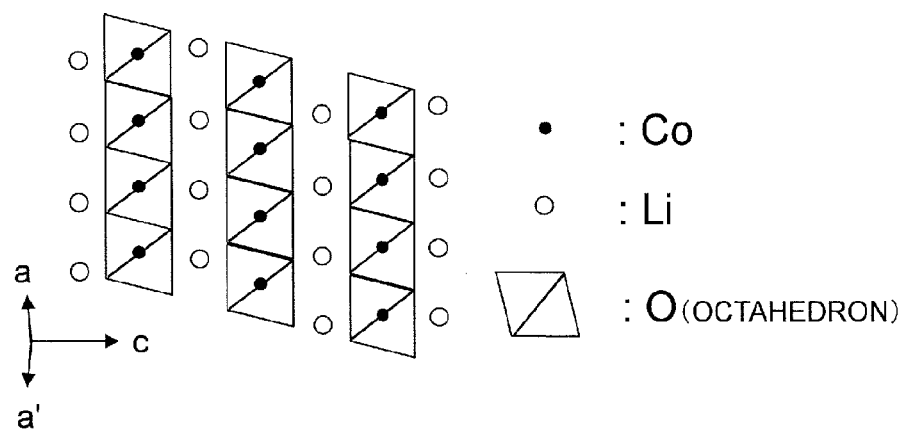
FIG. 2A shows a relationship between the crystal structure and the crystal axis of lithium cobaltate.

FIG. 2A schematically shows the crystal structure of lithium cobaltate. In FIG. 2A, each black circle represents a cobalt atom (Co), each white circle represents a lithium atom (Li), and each octahedron depicts oxygen atoms (O) located at the respective apices of the octahedron. Layers of cobalt oxide, each including a two-dimensional array of octahedrons of oxygen atoms with a cobalt atom in the center, and layers of lithium atoms, are alternately stacked. The $\alpha$-NaFeO$_2$ type crystal structure is a hexagonal system where, given a c axis which is the direction in which cobalt oxide layers and Li layers are stacked, an a axis and an a' axis constituting an angle of 1200 with the a axis can be defined within the plane in which each cobalt oxide layer or each Li layer expands. Given an aa' plane that contains the a axis and the a' axis, lithium migrates or diffuses in the aa' plane within the crystal structure of lithium cobaltate.

As shown in FIG. 1B, the z axis is defined in a direction perpendicular to the principal face 103c of the positive-electrode active material layer 103, whereas the x axis and the y axis are defined in two directions which are parallel to the principal face 103c and perpendicular to the z axis, these two directions being orthogonal to each other.

In this case, the aa' plane and the z axis are parallel to each other in the first regions 103a oriented in the (110) plane. In the second regions 103b oriented in the (018) plane, the angle between the aa' plane and the z axis is about 55°.

Figure 2B:
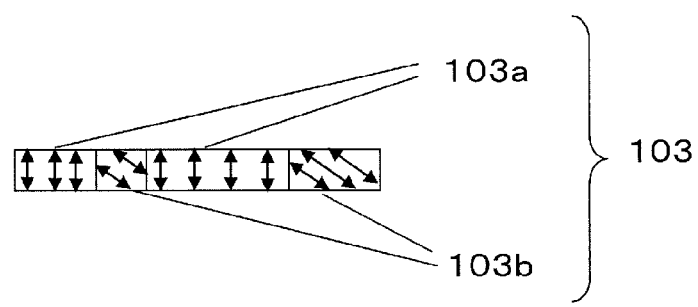
FIG. 2B shows directions of lithium insertion/release in the positive-electrode active material layer according to the first embodiment.

FIG. 2B shows directions, indicated by arrows, in which the aa' plane expands and lithium diffuses in the positive-electrode active material layer 103. As shown in FIG. 2B, in the first regions 103a the oriented in the (110) plane, lithium ions migrate in a direction perpendicular to the principal face 103c of the positive-electrode active material layer 103, that is, along the thickness direction of the positive-electrode active material layer 103. Moreover, in the second regions 103b oriented in the (018) plane, lithium ions migrate in a direction which is inclined by 55° from the normal of the principal face 103c (i.e., 35° from the principal face 103c). Thus, in the first regions 103a, lithium ions are likely to migrate along the thickness direction of the positive-electrode active material layer 103. Since this reduces the lithium diffusion distance, it becomes possible to insert lithium ions into the first regions 103a or release inserted lithium ions from the first regions 103a in short periods of time. Moreover, in the first regions 103a and the second regions 103b, since no crystal grain boundary exists along the thickness direction, it is unlikely for thickness-direction lithium diffusion to be hindered.

In the second regions 103b, the direction of lithium ion migration being inclined from the thickness direction makes for a longer diffusion distance. However, since the inclination is 55° from the normal of the principal face 103c, the diffusion distance is only about 1.7 times longer, which is not too long. Therefore, across the entire positive-electrode active material layer 103, it becomes easy to effect insertion/release of lithium ions to/from the lithium cobaltate, thus enhancing the output power of the lithium secondary battery.

Figure 2C:
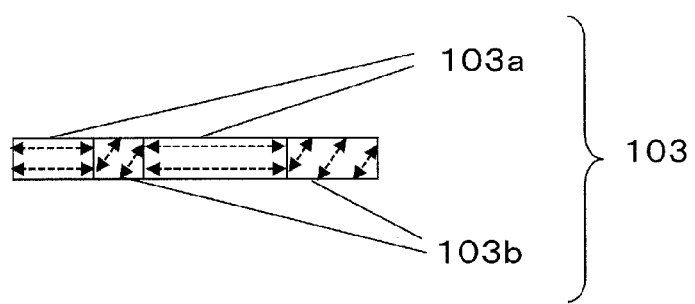
FIG. 2C shows directions of expansion/contraction in the positive-electrode active material layer according to the first embodiment.

FIG. 2C shows directions of expansion/contraction in the positive-electrode active material layer 103 due to charging and discharging. As shown in FIG. 2C, in the first regions 103a the oriented in the (110) plane, the positive-electrode active material layer 103 expands or contracts in a direction parallel to the principal face 103c of the positive-electrode active material layer 103, and hardly expands or contracts in a perpendicular direction thereto. Moreover, in the second regions 103b oriented in the (018) plane, the positive-electrode active material layer 103 expands or contracts in a direction which is inclined by 35° from the normal of the principal face 103c (i.e., 55° from the principal face 103c), and hardly expands or contracts in a perpendicular direction thereto. The directions of expansion/contraction in these two regions are essentially orthogonal. Therefore, the second regions 103b suppress expansion of the first regions 103a, while the first regions 103a suppress expansion of the second regions 103b. As a result, expansion/contraction of the positive-electrode active material layer 103 due to charging and discharging is suppressed as a whole, whereby the positive-electrode active material layer 103 is restrained from peeling or becoming detached off the positive-electrode current collector 102. Thus, the lithium secondary battery of the present embodiment can achieve good cycle characteristics.

(Positive-Electrode Current Collector 102)

The positive-electrode current collector 102 is composed of an electron conductor which does not cause any chemical reaction with the ion conductor 107 within the bounds of the designed applied voltage for the lithium secondary battery 101. For example, the positive-electrode current collector 102 is composed of stainless steel, aluminum, an aluminum alloy, platinum, gold, titanium, or the like. In particular, from the standpoint of electrical conductivity, resistance against the ion conductor, oxidation-reduction potential, etc., aluminum, an aluminum alloy, platinum, or gold may be selected.

In the case where the positive-electrode active material layer 103 is epitaxially grown on the positive-electrode current collector 102, a material which permits orientation in the (110) plane or the (018) plane as mentioned above is to be used. For example, $SrTiO_3$ (STO) to which electrical conductivity is conferred through La or Nb doping, Pt or other metals epitaxially grown on an MgO substrate or an Si substrate, or the like can be used. Moreover, the positive-electrode active material layer 103 may be formed on a substrate which permits epitaxial growth thereof, and the positive-electrode active material layer 103 may be peeled off the substrate and then placed on a positive-electrode current collector 102 which is composed of a material such as stainless steel or aluminum.

(Separator)

The separator 104 is an electrically insulative microporous structure having large ion transmission and a predetermined mechanical strength. An electrolyte solution which is an ion conductor, to be described later, is retained in the pores of the microporous structure, whereby the ion conductor becomes placed between the positive-electrode active material layer 103 and the negative-electrode active material layer 105.

As the separator 104, for example, a sheet or nonwoven fabric can be used which is composed of an olefin-type polymer such as polypropylene or polyethylene, glass fibers, or the like having an ability to withstand organic solvents and hydrophobicity, any of these being used alone or in combination. The pore diameter of the separator 104 is chosen in a size range which, even if the respective active material becomes detached from the positive-electrode active material layer 103 and the negative-electrode active material layer 105, does not allow any such active material to pass through. For example, the pore diameter is not less than 0.01 μm and not more than 1 μm. Generally speaking, the separator 104 has a thickness of not less than 10 μm and not more than 30 μm. Its porosity is generally 30% to 80%, although it is to be determined based on the permeability of electrons and ions, material, and thickness of the separator 104.

(Negative-Electrode Active Material Layer 105)

The negative-electrode active material layer 105 contains a negative-electrode active material which is composed of a compound capable of occluding and releasing lithium ions, e.g., a lithium alloy, an alloy, an intermetallic compound, carbon, an organic compound, an inorganic compound, a metal complex, or an organic polymer compound. These may be used each alone, or two or more such compounds may be used in combination. In addition, the negative-electrode active material layer 105 may contain an electrical conductivity aid, a binder, or the like.

(Negative-Electrode Current Collector 106)

The negative-electrode current collector 106 is composed of an electron conductor which does not cause any chemical reaction with the ion conductor 107 within the bounds of the designed applied voltage for the lithium secondary battery 101. For example, stainless steel, nickel, copper, titanium, platinum, gold, or the like can be used. In particular, from the standpoint of electrical conductivity, resistance against the ion conductor, and oxidation-reduction potential, copper, a copper alloy, platinum, or gold may be selected.

(Ion Conductor 107)

The ion conductor 107 functions to conduct lithium ions between the positive-electrode active material layer 103 of the positive electrode 120 and the negative-electrode active material layer 105 of the negative electrode 121. In the present embodiment, the ion conductor 107 is an electrolyte solution which contains a nonaqueous solvent and a lithium salt that is dissolved in the nonaqueous solvent.

Examples of the nonaqueous solvent include: cyclic carbonates, e.g., ethylene carbonate (EC), propylene carbonate (PC), butylene carbonate (BC), and vinylene carbonate (VC); acyclic carbonates, e.g., dimethyl carbonate (DMC), diethyl carbonate (DEC), ethyl methyl carbonate (EMC), methylpropyl carbonate (MPC), methylisobutyl carbonate (MIPC), and dipropyl carbonate (DPC); aliphatic carboxylate esters, e.g., methyl formate, methyl acetate, methyl propionate, and ethyl propionate; γ-lactones, e.g., γ-butyrolactone; acyclic ethers, e.g., 1,2-dimethoxyethane (DME), 1,2-diethoxy ethane (DEE), and ethoxymethoxy ethane (EME); cyclic ethers, e.g., tetrahydrofuran, and 2-methyl tetrahydrofuran; dimethyl sulfoxide; 1,3-dioxolane or the like; and alkyl phosphate esters such as trimethyl phosphate, triethyl phosphate, trioctyl phosphate, and fluorides thereof; one of them, or two or more of these in mixture, may be used. For example, a nonaqueous solvent whose main component is a mixture system of a cyclic carbonate and an acyclic carbonate or a mixture system of a cyclic carbonate, an acyclic carbonate, and an aliphatic carboxylate ester may be used.

As the lithium salt dissolved in such nonaqueous solvents, for example, $LiClO_4$, $LiBF_4$, $LiPF_6$, $LiAlCl_4$, $LiSbF_6$, LiSCN, LiCl, $LiCF_3SO_3$, $LiCF_3CO_2$, $Li(CF_3SO_2)_2$, $LiAsF_6$, $LiN(CF_3SO_2)_2$, $LiB_{10}Cl_{10}$, $LiN(C_2F_5SO_2)$, $LiPF_3(CF_3)_3$, $LiPF_3(C_2F_5)_3$ or the like can be used; one of them, or two or more of these in mixture, may be used in the nonaqueous solvent used. For example, it is more preferable that $LiPF_6$ be contained.

The electrolyte solution may contain one or more nonaqueous solvents and one or more lithium salts selected from the aforementioned compounds, so long as it is a homogeneous solution. For example, the electrolyte solution may contain ethylene carbonate, ethyl methyl carbonate, and $LiPF_6$. There is no particular limitation as to the lithium salt concentration in the electrolyte solution; for example, it may be not less than 0.2 mol/L and not more than 2 mol/L, or not less than 0.5 mol/L and not more than 1.5 mol/L. Moreover, it may contain any solvent or salt other than the aforementioned nonaqueous solvents and lithium salts.

(Battery Case 111)

The cap 108 of the battery case 111 may be an electron conductor which does not cause any chemical reaction with the ion conductor 107 within the bounds of the designed applied voltage of the lithium secondary battery 101. For electrical connection with the positive-electrode current collector 102, a leaf spring, a spring, or an electrically-conductive paste may be provided. For example, preferable materials are stainless steel, aluminum, and an aluminum alloy, where stainless steel is more preferable.

The case body 109, too, may be an electron conductor which does not cause any chemical reaction with the ion conductor 107 within the bounds of the designed applied voltage of the lithium secondary battery 101. For electrical connection with the negative-electrode current collector 106, a leaf spring, a spring, or an electrically-conductive paste may be provided. Preferable materials are stainless steel, nickel, and copper, where stainless steel is more preferable.

The electrically insulative sealant 110 is composed of a sealing material having an ability to withstand organic solvents and hydrophobicity, such that hermeticity and electrical insulation are achieved when the cap 108 and the case body 109 are fitted together. For example, rubber, Teflon (registered trademark), or the like can be used. For improved airtightness, pitch, grease, or adhesive may be applied on the surface of the electrically insulative sealant 110.

In the lithium secondary battery of the present embodiment, the positive-electrode active material layer is composed of lithium cobaltate, and includes first regions which are oriented in the (110) plane and second regions which are oriented in the (018) plane. Therefore, it is easy to effect insertion/release of lithium ions to/from the lithium cobaltate across the entire positive-electrode active material layer, and the output power of the lithium secondary battery can be enhanced. Moreover, directions of expansion/contraction due to charging and discharging are essentially orthogonal in the first regions oriented in the (110) plane and the second regions oriented in the (018) plane. As a result, expansion/contraction of the positive-electrode active material layer due to charging and discharging is suppressed as a whole, and the positive-electrode active material layer is restrained from peeling or becoming detached off the positive-electrode current collector. Thus, the lithium secondary battery of the present embodiment can attain good cycle characteristics.

Hereinafter, with reference to FIGS. 3A to 3H, a method for producing the lithium secondary battery of the present embodiment will be described.

Figure 3A:
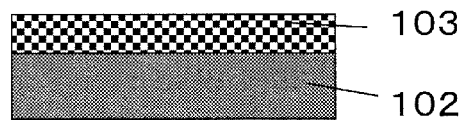
FIGS. 3A, 3B, 3C, 3D, 3E, 3F, 3G, and 3H are step-by-step cross-sectional views showing a production method for the lithium secondary battery according to the first embodiment.

First, as shown in FIG. 3A, an $SrTiO_3$ substrate doped with La is provided as the positive-electrode current collector 102. On the surface of the positive-electrode current collector 102, a positive-electrode active material layer 103 of lithium cobaltate was formed by using a sputter deposition technique, a vacuum evaporation technique, a chemical vapor deposition (CVD) technique, a pulse laser deposition technique (hereinafter PLD), or a sol-gel technique.

The positive-electrode active material layer 103 which only includes the first regions oriented in the (110) plane and the second regions oriented in the (018) plane can be formed on a substrate having similar surface symmetry to that of the (110) plane of the positive-electrode active material layer 103, with the growth conditions being appropriately controlled. Although the growth conditions may depend on the crystal growing method and therefore cannot be unequivocally defined, orientation in the (110) plane is more likely to occur as growth is performed under conditions that lead to longer diffusion distance of adsorbed atoms. On the other hand, regions of the (018) plane tend to increase under conditions that lead to shorter diffusion distance.

Figure 3B:
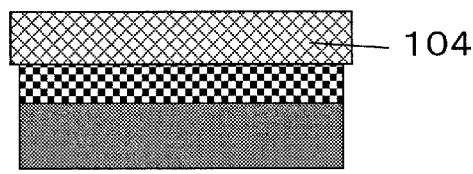

Next, as shown in FIG. 3B, the separator 104 is placed on the positive-electrode active material layer 103. When in sheet form, the separator 104 may be attached thereon after being formed in a desired size, or may be formed through application and drying of a slurry that contains an electrically insulative material.

Figure 3C:
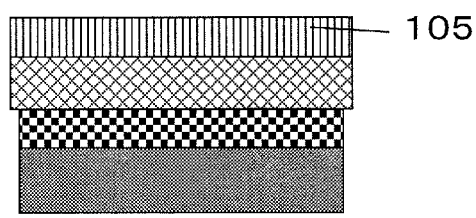

As shown in FIG. 3C, the negative-electrode active material layer 105 is placed on the separator 104. When in metal foil form, such as lithium metal, it may be attached thereon after being formed in a desired size, or may be formed through application and drying of a slurry that contains a negative-electrode active material.

Figure 3D:
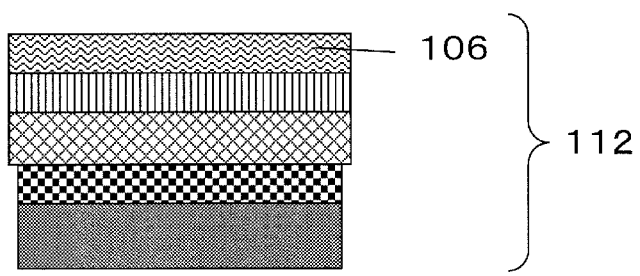

As shown in FIG. 3D, the negative-electrode current collector 106 is placed on the negative-electrode active material layer 105. Although this is unnecessary when the negative-electrode active material layer 105 is of a metal material, it may be formed by placing a metal foil on the negative-electrode active material.

Figure 3E:
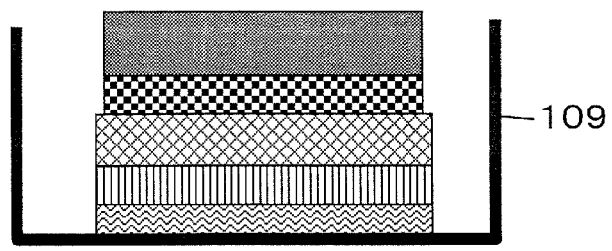

As shown in FIG. 3E, the laminate 112 is placed in the case body 109 with the negative-electrode current collector 106 side down. At this time, the negative-electrode current collector 106 and the case body 109 may be electrically connected.

Figure 3F:
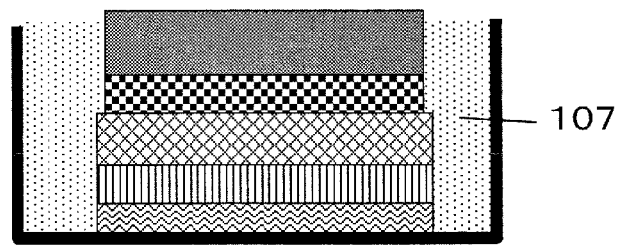

As shown in FIG. 3F, a predetermined amount of ion conductor 107 is injected in the case body 109 having the laminate 112 placed therein. After injection, the case body 109 may be vacuumed for degasing.

Figure 3G:
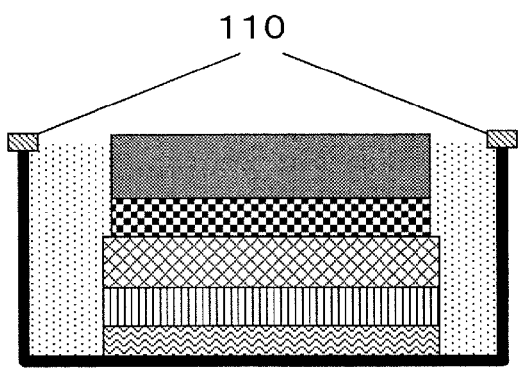

As shown in FIG. 3G, the electrically insulative sealant 110 is placed in order to ensure electrical insulation between the cap 108 and the case body 109 as well as airtightness inside the battery case 111. As the electrically insulative sealant 110, that of an O-ring shape may be disposed in place, or that of liquid form may be applied and then dried.

Figure 3H:
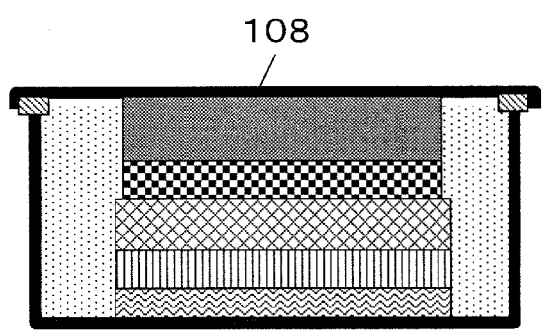

As shown in FIG. 3H, cap 108 is placed to complete the lithium secondary battery 101. After placement of the cap 108, crimping or laser welding may be applied for airtight closing.

Embodiment 2

A lithium secondary battery according to a second embodiment will be described.

Figure 4:
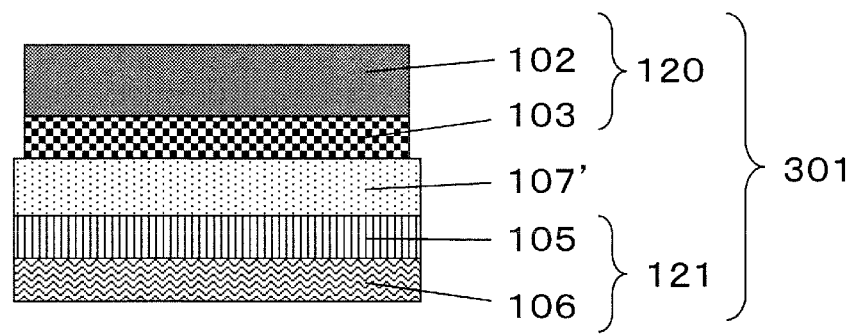
FIG. 4 is a cross-sectional view showing a lithium secondary battery according to a second embodiment.

FIG. 4 schematically shows a cross section of a lithium secondary battery 301 according to the present embodiment. The lithium secondary battery 301 of the present embodiment is an all-solid lithium secondary battery. The lithium secondary battery 301 includes a positive electrode 120, a negative electrode 121, and an ion conductor 107' interposed between the positive electrode 120 and the negative electrode 121.

The positive electrode 120 includes a positive-electrode current collector 102 and a positive-electrode active material layer 103. The negative electrode 121 includes a negative-electrode active material layer 105 and a negative-electrode current collector 106. In construction, the positive electrode 120 and the negative electrode 121 are identical to those of the first embodiment.

The ion conductor 107' is interposed between and in contact with the positive-electrode active material layer 103 and the negative-electrode active material layer 105.

The ion conductor 107' is a solid electrolyte which is electrically insulative. It is also lithium ion conductive. For example, the ion conductor 107' is composed of: oxides such as $(Li,La)TiO_3$ having a perovskite-type structure and $Li_7La_3Zr_2O_{12}$ having a garnet-type structure; sulfides such as $Li_{10}GeP_2S_{12}$; vitreous electrolytes such as $Li_2S$—$SiS_2$—$Li_3PO_4$ and $Li_2S$—$P_2S_5$; and $LiTi_2(PO_4)_3$ and $LiPO_4N$ having an NASICON-type structure.

In the lithium secondary battery 301 of the present embodiment, too, the positive-electrode active material layer 103 has the structure described in the first embodiment, so that an all-solid lithium secondary battery having high output power and good cycle characteristics can be realized.

Hereinafter, with reference to FIGS. 5A to 5D, a method for producing the lithium secondary battery according to the present Embodiment 2.

Figure 5A:
FIGS. 5A, 5B, 5C, and 5D are step-by-step cross-sectional views showing a production method for the lithium secondary battery according to the second embodiment.

First, as shown in FIG. 5A, an $SrTiO_3$ substrate doped with La is provided as the positive-electrode current collector 102. As has been described in the first embodiment, on the surface of the positive-electrode current collector 102, a positive-electrode active material layer 103 of lithium cobaltate is formed by a sputter deposition technique, a vacuum evaporation technique, a CVD technique, PLD, or a sol-gel technique.

Figure 5B:
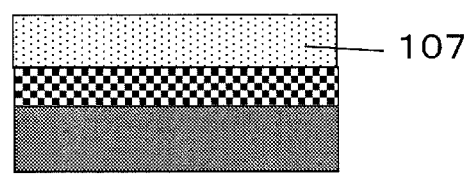

Next, as shown in FIG. 5B, the ion conductor 107' is formed on the positive-electrode active material by a sputter deposition technique, a vacuum evaporation technique, PLD, or a sol-gel technique. The ion conductor 107' is preferably formed via epitaxial growth utilizing crystallinity of the positive-electrode active material layer 103. For example, in the case where (Li,La)TiO$_3$ is formed as the ion conductor 107', epitaxial growth is possible by using PLD to conduct film formation in an oxygen ambient and at a temperature of about 600° C. to about 700° C.

Moreover, the ion conductor 107' may be formed as an amorphous body or a polycrystalline body. For example, in the case where LiPO$_4$N is formed as the ion conductor 107', an amorphous body can be formed through film formation by using a sputter deposition technique at room temperature.

Figure 5C:
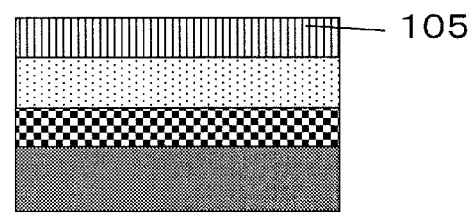

As shown in FIG. 5C, the negative-electrode active material layer 105 is formed on the ion conductor 107' by a sputter deposition technique, a vacuum evaporation technique, PLD, or a sol-gel technique.

Figure 5D:
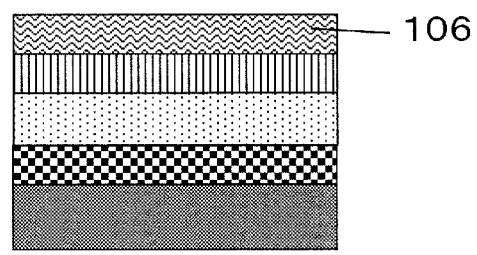

Furthermore, as shown in FIG. 5D, the negative-electrode current collector 106 is formed on the negative-electrode active material layer 105 by a sputter deposition technique, a vacuum evaporation technique, PLD, or a sol-gel technique.

With this production method, each layer composing the lithium secondary battery 301 can be produced by a thin-film formation process. Therefore, by selecting an appropriate thin-film formation method, for example, it is even possible to produce all layers without taking the lithium secondary battery 301 out of the thin-film formation apparatus. This provides advantages of easy handling during fabrication, reduced likelihood of external contamination during fabrication, and so on.

The lithium secondary battery according to the present disclosure permits various modifications, without being limited to the first and second embodiments above. Although the first and second embodiments illustrate that the positive-electrode active material layer has no crystal grain boundaries along the thickness direction, the first regions and the second regions may have overlaps along the thickness direction. In this case, crystal grain boundaries will be created along the thickness direction, so that the high output power characteristics of the lithium secondary battery may somewhat be deteriorated. However, since the positive-electrode active material layer only includes the first regions oriented in the (110) plane and the second regions oriented in the (018) plane, the positive-electrode active material layer is restrained from peeling off the current collector, and a lithium secondary battery with excellent cycle characteristics can be realized, as has been described in the first embodiment.

In the first and second embodiments above, the positive-electrode active material layer only includes the first regions oriented in the (110) plane and the second regions oriented in the (018) plane. From the standpoint of suppressing expansion/contraction of the positive-electrode active material layer, instead of the second regions oriented in the (018) plane, a third region(s) oriented in the (003) plane or a fourth region(s) oriented in the (104) plane may be included. In a third region oriented in the (003) plane, the direction of ion migration is perpendicular to the z axis. In a fourth region oriented in the (104) plane, the direction of ion migration constitutes an angle of 45° with respect to the z axis. Therefore, also by using a positive-electrode active material layer which includes first regions and third regions, or which includes first regions and fourth regions, cycle characteristics can be enhanced similarly to the first embodiment.

EXAMPLES

Results of producing lithium secondary batteries according to the embodiment, and measuring their characteristics and the like, will now be described.

Example 1

According to the procedure illustrated in FIGS. 3A to 3H, a lithium secondary battery 101 according to the first embodiment was produced.

First, a laminate 112 was produced. As shown in FIG. 3A, as a positive-electrode current collector 102, an STO substrate (10 mm×10 mm, thickness 500 μm) oriented in the single-crystalline (110) plane was provided. On the surface of the positive-electrode current collector 102, a positive-electrode active material layer 103 of lithium cobaltate was formed by PLD. As the target, a sintered oxide target containing Li and Co at a ratio of Li:Co=1.3:1 was used. The film formation conditions by PLD were as follows.

laser pulse energy: 100 mJ
pulse frequency: 5 Hz
oxygen partial pressure: 10 Pa
substrate temperature: 400° C.
distance between the target and the substrate: 40 mm The positive-electrode active material layer 103 thus produced had a thickness of 800 nm.

Next, as shown in FIG. 3B, a separator 104 was placed on the positive-electrode active material layer 103. As the separator 104, a polypropylene separator having a thickness of 20 μm and a size of φ=16 mm was used.

As shown in FIG. 3C, a negative-electrode active material layer 105 was placed on the separator 104. As the negative-electrode active material layer 105, a lithium foil having a thickness of 1 mm and a size of φ=15 mm was used.

Since a lithium foil was used as the negative-electrode active material layer 105, the negative-electrode current collector 106 shown in FIG. 3D was not used.

As shown in FIG. 3E, the laminate 112 was placed in a case body 109 having a leaf spring provided therein, so that the negative-electrode active material layer 105 faced down.

As shown in FIG. 3F, while placing the laminate 112 in the case body 109, 0.3 g of an electrolyte solution (EC: EMC=1:3) containing LiPF$_6$ at 1.25 M was injected into the case body 109. After injection, degasing was carried out at −760 mmHg for 1 minute.

As shown in FIG. 3G, an electrically insulative sealant 110 of an O-ring shape was placed above the case body 109.

As shown in FIG. 3H, after the cap 108 was placed on the electrically insulative sealant 110, the cap 108 was crimped to complete the lithium secondary battery 101.

Characteristics of the device of Example 1 were evaluated. A potentiostat was connected to the cap 108 and the case body 109, and a discharge capacity after a constant-current (CC) charging up to 4.2 V at 60 μA, followed by a discharging down to 2.0 V, was defined as 1C. The 2C/1C capacity ratio was 0.64. One cycle was defined as involving a CC charging up to 4.2 V and a discharging down to 2.0 V. Then, an increase rate from a 100 Hz AC resistance value after 1 cycle to a resistance value after 10 cycles (resistance value at the $10^{th}$ cycle/resistance value at the $1^{st}$ cycle) was measured, which read 1.05. Observation upon disassembly after 10 cycles showed no peeling.

Figure 6A:
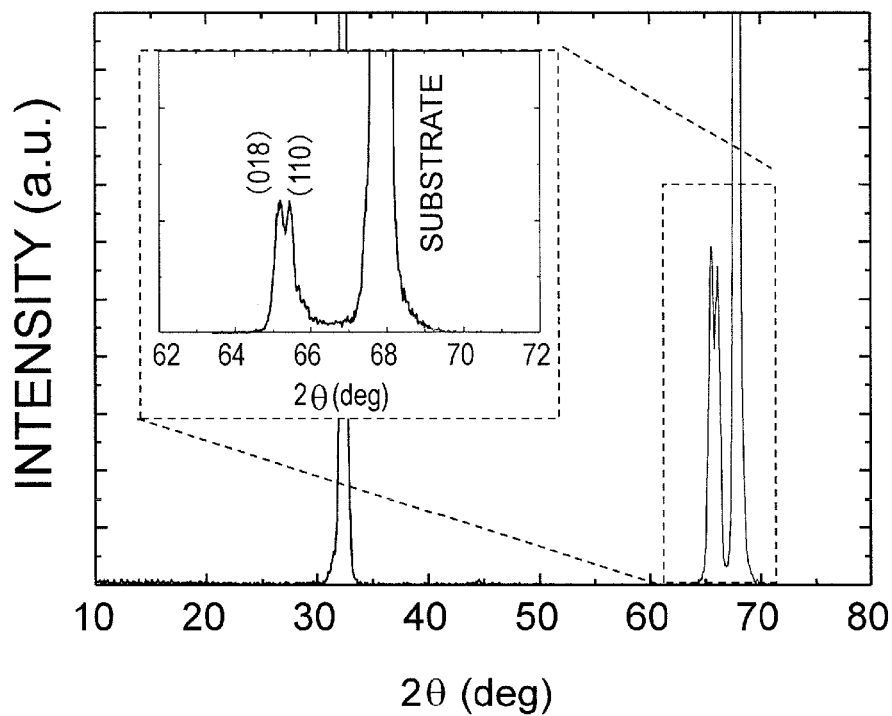
FIGS. 6A and 6B show X-ray diffraction patterns according to Example 3 and Comparative Example 3.

Moreover, by using an X-ray diffraction apparatus (X'Pert MRD manufactured by Philips), the crystal structure of the positive-electrode active material layer 103 when discharged was examined. The resultant X-ray diffraction pattern is shown in FIG. 6A. The peak intensity ratio (018)/(110) between the (018) plane and the (110) plane was 1.0. Peak intensities other than (018) and (110), e.g., (003) or (104), were very small; that is, the peak intensity of (003) was 1/20 or less of the peak intensity of (110). The first regions 103a oriented in the (110) plane had a 2.85 Å crystal lattice along the a axis and a 13.42 Å crystal lattice along the c axis, whereas the (018) oriented regions had a 2.83 Å crystal lattice along the a axis and a 14.09 Å crystal lattice along the c axis.

Through TEM observation of a cross section of the positive-electrode active material layer 103, it was confirmed that two kinds of regions with different crystal orientations were contained in the positive-electrode active material layer 103. A φ-scan by X-ray diffractometry was conducted, which revealed that the (110) oriented regions and (018) oriented regions both had the same two-fold symmetry as that of the substrate, indicative of being an epitaxial film.

Furthermore, while varying the elevation angle and the azimuth angle of the specimen, X-ray diffraction peak intensity measurements of the (003) plane, the (104) plane, and the (113) plane were taken (i.e., Pole-Figure method; for example, Non-Patent Document 1 discloses a Pole-Figure pattern of the (003) plane of a lithium cobaltate film which is oriented in the (018) plane). Crystal orientations along directions in the xy plane were derived from the Pole-Figure pattern, which revealed that the [−441] direction in the first regions 103a the oriented in the (110) plane and the [−4-81] direction in the second regions 103b oriented in the (018) plane were parallel. Moreover, the [2-21] direction in the first regions 103a oriented in the (110) plane and the [100] direction in the second regions 103b oriented in the (018) plane were parallel.

Moreover, an inductively coupled plasma-atomic emission spectrometer (an ICP analyzer designated SPS1700VR, manufactured by Hitachi High-Tech Science Corporation) was used to evaluate the composition of the positive-electrode active material layer 103, which revealed Li:Co=1: 1.05.

Example 2

A device was produced in a similar manner to Example 1, except for the following differences in the conditions for forming the positive-electrode active material layer 103 by PLD: the laser pulse energy was 90 mJ; the pulse frequency was 5 Hz; the oxygen partial pressure was 12 Pa; the substrate temperature was 420° C.; and the distance between the target and the substrate was 55 mm.

Characteristics of the device of Example 2 were evaluated, which revealed that the 2C/1C capacity ratio was 0.62, and that the increase rate in resistance value after 10 cycles was 1.12. No peeling was observed.

X-ray diffractometry showed that the positive-electrode active material had (018)/(110)=0.42. Other peak intensities (e.g., (003) and (104)) were very small; the (003) peak intensity was 1/20 or less of the (110) peak intensity. When discharged, the first regions 103a oriented in the (110) plane had a crystal lattice of 2.84 Å along the a axis, and a crystal lattice of 13.68 Å along the c axis. When discharged, the (018) oriented regions had a crystal lattice of 2.82 Å along the a axis, and a crystal lattice of 14.10 Å along the c axis.

A φ-scan by X-ray diffractometry was conducted, which revealed that the first regions 103a oriented in the (110) plane and the second regions 103b oriented in the (018) plane both had the same two-fold symmetry as that of the substrate, indicative of being an epitaxial film. Through TEM observation of a cross section of the positive-electrode active material layer 103, it was confirmed that two kinds of regions with different crystal orientations were contained in the positive-electrode active material layer 103.

An ICP analyzer was used to evaluate the composition of the positive-electrode active material layer 103, which revealed Li:Co=1:1.03.

Example 3

A device was produced in a similar manner to Example 1, except for the following differences in the conditions for forming the positive-electrode active material layer 103 by PLD: the laser pulse energy was 70 mJ; the pulse frequency was 2.5 Hz; the oxygen partial pressure was 3 Pa; the substrate temperature was 450° C.; and the distance between the target and the substrate was 60 mm.

Characteristics of the device of Example 2 were evaluated. The 2C/1C capacity ratio was 0.65, and the increase rate in resistance value after 10 cycles was 1.55. No peeling was observed.

X-ray diffractometry showed that the positive-electrode active material had (018)/(110)=0.11. Other peak intensities (e.g., (003) and (104)) were very small; the (003) peak intensity was 1/20 or less of the (110) peak intensity. When discharged, the (110) oriented regions had a crystal lattice of 2.83 Å along the a axis, and a crystal lattice of 13.87 Å along the c axis. When discharged, the (018) oriented regions had a crystal lattice of 2.82 Å along the a axis, and a crystal lattice of 14.05 Å along the c axis.

A φ-scan by X-ray diffractometry was conducted, which revealed that the (110) oriented regions and (018) oriented regions both had the same two-fold symmetry as that of the substrate, indicative of being an epitaxial film.

Example 4

A device was produced in a similar manner to Example 1, except for the following differences in the conditions for forming the positive-electrode active material layer 103 by PLD: the laser pulse energy was 150 mJ; the pulse frequency was 5 Hz; the oxygen partial pressure was 7 Pa; the substrate temperature was 430° C.; and the distance between the target and the substrate was 50 mm.

Characteristics of the device of Example 2 were evaluated. The 2C/1C capacity ratio was 0.63, and the increase rate in resistance value after 10 cycles was 1.25. No peeling was observed.

X-ray diffractometry showed that the positive-electrode active material had (018)/(110)=2.5. Other peak intensities (e.g., (003) and (104)) were very small; the (003) peak intensity was 1/20 or less of the (110) peak intensity. When discharged, the (110) oriented regions had a crystal lattice of 2.83 Å along the a axis, and a crystal lattice of 13.75 Å along the c axis. When discharged, the (018) oriented regions had a crystal lattice of 2.81 Å along the a axis, and a crystal lattice of 14.12 Å along the c axis.

A φ-scan by X-ray diffractometry was conducted, which revealed that the (110) oriented regions and (018) oriented regions both had the same two-fold symmetry as that of the substrate, indicative of being an epitaxial film.

Comparative Example 1

A device was produced in a similar manner to Example 1, except for the following differences in the conditions for forming a positive-electrode active material layer by PLD: the target composition was Li:Co=1.4:1: the laser pulse energy was 50 mJ; the pulse frequency was 2.5 Hz; the oxygen partial pressure was 3 Pa; the substrate temperature was 500° C.; and the distance between the target and the substrate was 55 mm.

Characteristics of the device of Comparative Example 1 were evaluated. The 2C/1C capacity ratio was 0.68, and the increase rate in resistance value after 10 cycles was 2.85. Peeling was observed by visual inspection.

X-ray diffractometry showed no peak other than that of the (110) plane. When discharged, it had a crystal lattice of 2.81 Å along the a axis, and a crystal lattice of 13.98 Å along the c axis.

An ICP analyzer was used to evaluate the composition of the positive-electrode active material layer 103, which revealed Li:Co=1:0.99.

Comparative Example 2

A device was produced in a similar manner to Example 1, except for the following differences in the conditions for forming a positive-electrode active material layer by PLD: the laser pulse energy was 200 mJ; the pulse frequency was 5 Hz; the oxygen partial pressure was 8 Pa; the substrate temperature was 400° C.; and the distance between the target and the substrate was 40 mm.

Characteristics of the device of Comparative Example 2 were evaluated. The 2C/1C capacity ratio was 0.57, and the increase rate in resistance value after 10 cycles was 2.10. No peeling was observed.

X-ray diffractometry showed no peak other than that of the (018) plane. When discharged, it had a crystal lattice of 2.82 Å along the a axis, and a crystal lattice of 14.05 Å along the c axis.

Comparative Example 3

A device was produced in a similar manner to Example 1, except for the following differences in the conditions for forming a positive-electrode active material layer by PLD: the laser pulse energy was 130 mJ; the pulse frequency was 5 Hz; the oxygen partial pressure was 5 Pa; the substrate temperature was 200° C.; and the distance between the target and the substrate was 60 mm.

Figure 6B:
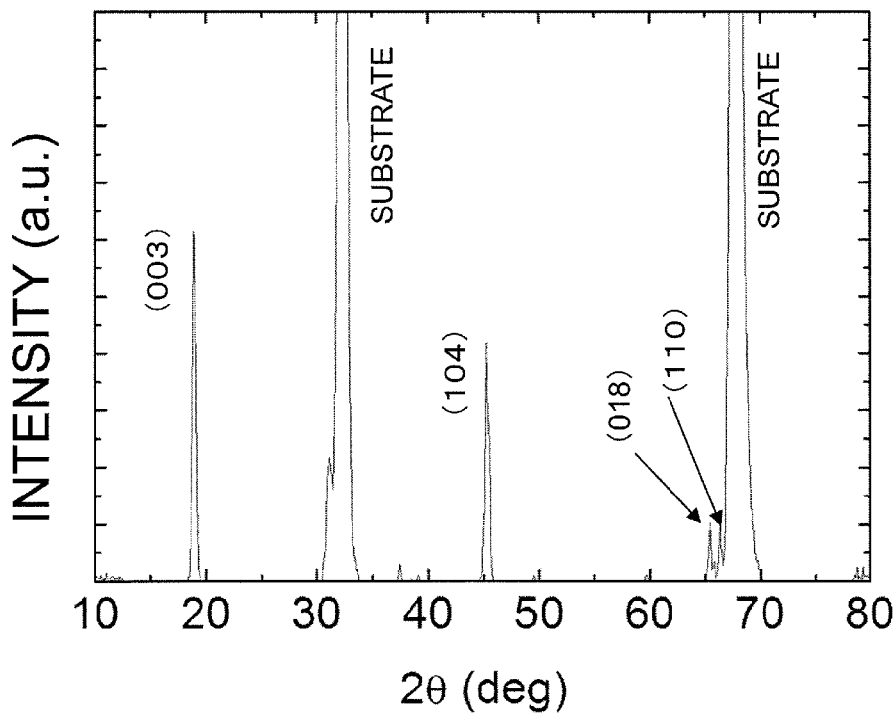

Characteristics of the device of Comparative Example 3 were evaluated. The 2C/1C capacity ratio was 0.49, and the increase rate in resistance value after 10 cycles was 4.95. No peeling was observed. Observation by X-ray diffractometry revealed a peak of the (110) plane and a peak of the (018) plane, but also a peak of the (003) plane and a peak of the (104) plane, indicative of the fact that the positive-electrode active material layer 103 was polycrystalline (FIG. 6B). When discharged, it had a crystal lattice of 2.83 Å along the a axis, and a crystal lattice of 14.07 Å along the c axis.

Furthermore, by a Pole-Figure method of X-ray diffractometry, peak intensity measurements of the (003) plane, the (104) plane, and the (113) plane were taken, and crystal orientations along directions in the xy plane were derived. This indicated no correlation between the (110) oriented region and the (018) oriented region as to crystal orientations along in-plane directions.

(Results and Discussions Thereof)

Results of Examples 1 to 4 and Comparative Examples 1 to 3 above are shown in Table 1.

TABLE 1

| | X-ray peak intensity ratio (018)/(110) | lattice constant | | | | $c(110)/$ $c(018)$ | $c(110)/$ $a(110)$ | results of battery characteristics evaluation | |
|---|---|---|---|---|---|---|---|---|---|
| | | (110) | | (018) | | | | capacity ratio 2 C/1 C | resistance increase rate (10 cycle/ 1 cycle) |
| | | a | c | a | c | | | | |
| Example 1 | 1.0 | 2.65 | 13.42 | 2.83 | 14.09 | 0.95 | 4.70 | 0.64 | 1.05 |
| Example 2 | 0.42 | 2.84 | 13.68 | 2.82 | 14.10 | 0.97 | 4.82 | 0.62 | 1.12 |
| Example 3 | 0.11 | 2.83 | 13.87 | 2.82 | 14.05 | 0.99 | 4.90 | 0.65 | 1.55 |
| Example 4 | 2.5 | 2.83 | 13.75 | 2.81 | 14.12 | 0.97 | 4.86 | 0.63 | 1.25 |
| Comparative Example 1 | — (110 only) | 2.81 | 13.98 | — | — | — | 4.97 | 0.68 | 2.85 |
| Comparative Example 2 | — (018 only) | — | — | 2.82 | 14.05 | — | — | 0.57 | 2.10 |
| Comparative Example 3 | poly crystalline | a = 2.83, c = 14.07 | | | | 1.00 | 4.95 | 0.49 | 2.21 |

The lithium secondary batteries of Examples 1 to 4 include a positive-electrode active material layer in which first regions oriented in the (110) plane and second regions oriented in the (018) plane are mixedly present. In any of these lithium secondary batteries, the resistance increase rate after 10 cycles is smaller than those of Comparative Example 1 (a single crystal oriented in the (110) plane), Comparative Example 2 (a single crystal oriented in the (018) plane), and Comparative Example 3 (polycrystalline), indicative of improved cycle characteristics. This is considered to be because, as has been described in the first embodiment, the mixed presence of two crystal regions of different orientations allows expansion/contraction of the respective crystal regions to be mutually suppressed, so that peeling of the positive-electrode active material layer from the positive-electrode current collector is also suppressed.

Moreover, the cycle characteristics of Examples 1 to 4 are also improved over those of Comparative Example 3, which includes a polycrystalline positive-electrode active material layer. Although it might be possible that the random orientations in the respective crystal regions of the polycrystal allowed expansion/contraction of the respective crystal regions to be mutually suppressed, this is presumably an indication of greater expansion/contraction suppression effects in Examples 1 to 4 than in the polycrystalline case.

The 2C/1C capacity ratio was the highest for Comparative Example 1 (a single crystal oriented in the (110) plane). However, Examples 1 to 4 attain substantially similar values, and thus can be said to have good charge-discharge characteristics. In particular, Examples 1 to 4 exhibit excellent charge-discharge characteristics over those of Comparative Example 3 (polycrystalline)

Moreover, it was found that, in Examples 1 to 4, the c axis is shorter in the first regions oriented in the (110) plane than in the second regions oriented in the (018) plane. Specifically, a relationship of 0.95<c(110)/c(018)<0.99 was found, where c(110) represents a lattice constant of the first regions along the c axis and c(018) represents a lattice constant of the second regions along the c axis.

A composition analysis also indicated the Li:Co ratio to be slightly Co-excessive.

Thus, it was confirmed from the results of Examples 1 to 4 and Comparative Examples 1 to 3 that the lithium secondary battery of the present embodiment has good cycle characteristics with high output power.

The lithium secondary battery disclosed herein has high charge-discharge characteristics and reliability, and is useful as a main power supply for a mobile batteried device, a main power supply for a power tool, and an industrial-use main power supply for an electric vehicle or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A lithium secondary battery comprising:
a positive electrode including a positive-electrode active material layer;
a negative electrode including a negative-electrode active material layer, the negative-electrode active material layer allowing lithium ions to be inserted and allowing inserted lithium ions to be released; and
an ion conductor interposed between the positive electrode and the negative electrode, the ion conductor being lithium ion conductive, wherein,
the positive-electrode active material layer comprises lithium cobaltate, and has an α-NaFeO$_2$ type crystal structure; and
the positive-electrode active material layer is composed only of first regions oriented in the (110) plane and second regions oriented in the (018) plane, the first regions and second regions being mixedly present in an xy plane of the positive-electrode active material layer, where an x axis and a y axis which are defined as two axes that are parallel to a principal face of the positive-electrode active material layer, and a z axis which is defined as an axis that is perpendicular to the principal face.

2. The lithium secondary battery of claim 1, wherein a [−441] direction in the first regions is parallel to a [−4-81] direction in the second regions, and a [2-21] direction in the first regions is parallel to a [100] direction in the second regions.

3. The lithium secondary battery of claim 2, wherein, in an X-ray diffractometry of the positive-electrode active material layer, a ratio (I(018)/I(110)) between a peak intensity I(018) of the (018) plane and a peak intensity I(110) of the (110) plane satisfy the relationship 0.1<I(018)/I(110)≤2.5.

4. The lithium secondary battery of claim 3, wherein a ratio between a lattice constant c(110) of the first regions along the c axis and a lattice constant c(018) of the second regions along the c axis satisfy 0.95<c(110)/c(018)<0.99.

5. The lithium secondary battery of claim 1, wherein the ion conductor is a solid electrolyte.

6. The lithium secondary battery of claim 1, wherein the ion conductor is an electrolyte solution.

7. The lithium secondary battery of claim 1, wherein,
the positive electrode further comprises a current collector; and
the positive-electrode active material layer is an epitaxial film on the current collector.

8. The lithium secondary battery of claim 7, wherein the current collector is a strontium titanate substrate, the strontium titanate substrate being doped with a dopant and electrically conductive.

9. The lithium secondary battery of claim 1, wherein, in the positive-electrode active material layer, there is no overlap between the first regions and the second regions along the z axis direction.

10. The lithium secondary battery of claim 1, wherein the (110) plane of the first regions is parallel to the principal face of the positive-electrode active material layer, and the (018) plane of the second regions is parallel to the principal face of the positive-electrode active material layer.

11. The lithium secondary battery of claim 1, wherein, when the positive-electrode active material layer is subjected to X-ray diffraction intensity measurement, an integral value of a total of peaks associated with any crystal which is oriented in the (110) plane and peaks associated with any crystal oriented in the (018) plane accounts for 95% or more of an integral value of all diffraction peaks, it is determined that the positive-electrode active material layer is composed only of the first regions oriented in the (110) plane and the second regions oriented in the (018) plane.

* * * * *